(12) United States Patent
Audren et al.

(10) Patent No.: US 10,121,560 B2
(45) Date of Patent: Nov. 6, 2018

(54) ASSEMBLY INCLUDING A PACKAGE FOR TRANSPORT OF RADIOACTIVE MATERIALS AND A PACKAGE SUPPORT FRAME

(71) Applicant: TN International, Montigny le Bretonnuex (FR)

(72) Inventors: Alexandre Audren, Laudun (FR); Lilian Viallon, Bollène (FR)

(73) Assignee: TN INTERNATIONAL, Montigny le Bretonneux (FR)

( * ) Notice: Subject to any disclaimer, the term of this patent is extended or adjusted under 35 U.S.C. 154(b) by 109 days.

(21) Appl. No.: 14/911,861

(22) PCT Filed: Aug. 13, 2014

(86) PCT No.: PCT/EP2014/067308
§ 371 (c)(1),
(2) Date: Feb. 12, 2016

(87) PCT Pub. No.: WO2015/022353
PCT Pub. Date: Feb. 19, 2015

(65) Prior Publication Data
US 2016/0189814 A1    Jun. 30, 2016

(30) Foreign Application Priority Data
Aug. 14, 2013 (FR) ..................... 13 58028

(51) Int. Cl.
*B60P 7/08* (2006.01)
*G21F 5/08* (2006.01)
(Continued)

(52) U.S. Cl.
CPC .................. *G21F 5/08* (2013.01); *B60P 7/06* (2013.01); *B60P 7/12* (2013.01); *G21F 5/14* (2013.01)

(58) Field of Classification Search
CPC .......... G21F 5/002; G21F 5/005; G21F 5/008; G21F 5/08; G21F 5/14; B60P 7/06; B60P 7/12
(Continued)

(56) References Cited

U.S. PATENT DOCUMENTS 4,861,205 A   8/1989 Wozniak
5,688,086 A * 11/1997 Menzemer ........... B65D 88/121
                                                    410/44

(Continued)

FOREIGN PATENT DOCUMENTS

FR    2 846 778 A1    5/2004
FR    2 971 491 A1    8/2012

OTHER PUBLICATIONS

Search Report issued in French Patent Application No. FR 13 58028 dated Apr. 1, 2014.
(Continued)

*Primary Examiner* — Stephen T Gordon
(74) *Attorney, Agent, or Firm* — Pearne & Gordon LLP (57) ABSTRACT

An assembly (100) including a package for transport of radioactive materials (1) and a package support frame (3), wherein the frame includes: a first portion (14); a second portion (16) which is rigidly attached to the package, wherein the package and this second portion form an entity (18), wherein the first portion and the second portion of the frame (14, 16) are connected to one another by one or more mechanical fusible elements (30) to hold one relative to the other in a first direction of superposition (12) of the package on its frame. The assembly is also configured so that if the assembly falls in the direction (12) with the first portion (14) of the frame pointing forwards, this causes a rupture of the fusible elements (30) allowing a movement of the entity (18) relative to the first portion (14) in direction (12).

15 Claims, 7 Drawing Sheets

(51) Int. Cl.
*G21F 5/14* (2006.01)
*B60P 7/12* (2006.01)
*B60P 7/06* (2006.01)

(58) Field of Classification Search
USPC .................. 410/34, 36, 42, 47, 49, 50, 120;
376/272; 250/506.1, 507.1; 220/1.5;
403/2
See application file for complete search history.

(56) References Cited

U.S. PATENT DOCUMENTS

| | | |
|---|---|---|
| 5,841,147 A | 11/1998 | Steinke |
| 2010/0119029 A1 | 5/2010 | Viallon |
| 2013/0078048 A1* | 3/2013 | Strang ...................... B60P 7/12 410/49 |

OTHER PUBLICATIONS

International Preliminary Report on Patentability issued in Application No. PCT/EP2014/067308 dated Oct. 26, 2015.
International Search Report issued in Application No. PCT/EP2014/067308 dated Oct. 20, 2014.
Written Opinion issued in Application No. PCT/EP2014/067308 dated Oct. 20, 2014.

* cited by examiner

ASSEMBLY INCLUDING A PACKAGE FOR TRANSPORT OF RADIOACTIVE MATERIALS AND A PACKAGE SUPPORT FRAME

TECHNICAL FIELD

The present invention relates to the field of transporting radioactive materials. More specifically it relates to an assembly including a package for transport of radioactive materials and a package support frame, wherein the frame is generally intended to be attached to a transport vehicle.

STATE OF THE PRIOR ART

An assembly for transporting radioactive materials habitually has a side body, a base and a cover. These portions of the package define a cavity for housing radioactive materials, for example nuclear material assemblies or waste canisters. In addition, a basket may be fitted within the housing cavity to define compartments in which the different canisters/nuclear material assemblies are placed.

To transport the package between different sites the latter is placed on a transport vehicle, for example a road transport motor vehicle. To do so the vehicle habitually has a platform receiving a frame supporting the package. The assembly formed by the frame and the package may be positioned and installed on the platform of the vehicle, and the vehicle then undertakes the transport. On arriving at the site the assembly may be removed from the platform of the vehicle, but more generally only the package is removed since the frame remains on the vehicle.

Demonstration of the safety of the package is based in particular on statutory drop tests such as a free drop test or a drop onto a punch bar, with the package either loaded or not loaded with radioactive materials, the most unfavourable case then being taken as the reference. The packages are thus configured for satisfying these requirements required for their certification.

But some packages must also be configured to satisfy the different regulations for transport of radioactive materials, in particular ascertaining that in the event a fall of an assembly including the frame and its package the safety of the latter is not reduced.

If this assembly falls in a direction of superposition of the package on its frame, with the frame pointing forwards, the risks of the package being damaged by the frame are high. To respond to this constraint it may be chosen to make the package very large to resist the forces transmitted by the frame in the event of a fall, and to limit the risks of damage which might impair the package's safety. Nevertheless, such oversizing might prove to be incompatible with the operating constraints.

DESCRIPTION OF THE INVENTION

The aim of the invention is therefore to provide at least partially a solution to the disadvantages mentioned above, compared with the embodiments of prior art.

To achieve this purpose the object of the invention is an assembly including a package for transport of radioactive materials together with a package support frame, wherein the frame includes:
- a first portion;
- a second portion which is rigidly attached to the package, wherein the package and this second portion form an entity.

In addition, the first portion and the second portion of the frame are connected to one another by one or more mechanical fusible elements to hold one relative to the other in a first direction of superposition of the package on its frame, and the assembly is configured so that a fall of the assembly in said first direction with the first portion of the frame pointing forwards in this first direction causes a rupture of said mechanical fusible elements, allowing said entity to move relative to said first portion, in said first direction.

Therefore, by providing this possibility for said entity to move relative to the first portion of the frame in the first direction, after rupture of the mechanical fusible elements, the risks of damage of the package by the frame are substantially reduced. In other words, the invention is advantageous in that it enables a package to be presented which satisfies the safety requirements without however being oversized, facilitating its use.

In addition, by providing such a partial or total separation of the first portion of the frame from the entity, following the rupture of the fusible elements, it becomes possible to use the safety demonstration of the falling package without the frame, to demonstrate the safety of the falling package with this same frame.

It is to be noted that the desired relative movement between the first portion of the frame and the entity may be a translational motion along said first direction, or any other movement, whether simple or composed, leading to a change of the relative position of the first portion to the frame and the entity, in said first direction.

The first and second portions of the frame preferably comprise guidance means allowing said entity to be guided, at least during a part of said relative movement, relative to the first portion in said first direction.

Thus, these guidance means confer a preferred relative movement direction, wherein this direction is determined in such a way that the risks of the package being damaged by other portions of the frame are limited as far as possible. Guidance is preferentially active from the start of said relative movement of the entity to the first portion of the frame, after rupture of the mechanical fusible elements, and even more preferentially active during the rupture of the mechanical fusible elements.

However, other preferred directions of relative movement may be adopted, without going beyond the scope of the invention, again so as to lead to a change of the relative position of the first portion to the frame and the entity, in said first direction.

It is to be noted that said guidance means preferentially include one or more rails, preferably traversed by the mechanical fusible element(s) before their rupture. These rails may, for example, be constructed within uprights or using flanges.

Said package preferably includes shock-absorbing means, preferentially shock-absorbing caps fitted at the ends of the package. The assembly is also configured so that during said fall onto a flat impact surface orthogonal to said first direction said rupture of each mechanical fusible element occurs before the shock-absorbing means make contact with the impact surface.

Alternatively, it is possible to design a configuration which leads to the rupture of the fusible elements at the same time as the caps start to be crushed.

Each mechanical fusible element preferably takes the form of a shearing device, preferably having a mechanically weakened portion.

For example, this mechanically weakened portion may be a small section of a shearing plug, such as a groove, which enables an initial rupture area to be formed.

It is noted that the mechanical fusible elements might be attached to the first and second portions of the frame, or alternatively form an integral part of one of these two portions. It might also involve a mechanically weakened portion positioned between two portions manufactured as a single part with this mechanically weakened portion, wherein said two portions belong respectively to the first and second portions of the frame.

The assembly is preferably configured so that after the rupture of each mechanical fusible element said entity is free relative to the first portion of the frame.

This enables the risks of damage of the package by the frame to be limited as far as possible. In this regard, it is preferentially provided that, during the entire fall, after rupture of the fusible elements said entity remains free relative to the first portion of the frame. In other words, it is preferentially arranged such that the entity is able to move relative to the first portion without this movement being hindered by any portion of the frame.

As this has been previously mentioned, this freedom of movement may, for example, be restricted to a free translational motion of the entity relative to the first portion of the frame, in said first direction.

Alternatively, the assembly may be configured so that after the rupture of each mechanical fusible element said entity remains connected to the first portion of the frame by one or more connecting elements which may be deformed plastically during said relative movement.

These deformable connecting elements are involved in mechanical holding of the entity on the first portion of the frame, under normal transport conditions. They are configured to be deformed only in the event of a fall, after rupture of the mechanical fusible elements.

Preferably, the second portion of the frame is connected to the first portion by this/these plastically deformable connecting elements.

Said first portion of the frame preferably includes uprights, preferably in the form of rails, extending preferably longitudinally in said first direction.

Said uprights are preferably four in number, connected two-by-two by mechanical reinforcement means positioned at regular intervals along the body of the package.

Said second portion of the frame preferably includes two structures, preferably annular structures, surrounding a body of the package.

Each structure is preferentially formed using two portions that may be disassembled, each of which extends over roughly 180°.

Each of the two portions that may be disassembled is roughly semi-circular, so as to form roughly annular structures. Alternatively, at least one of the two portions that may be disassembled of each structure has an overall U shape, such that the branches of the U are used to slide the entity in a guided manner relative to the first portion of the frame, in a first direction, and after rupture of the mechanical fusible elements. To achieve this, the branches of the U are preferentially oriented in said first direction.

The abovementioned structures are preferably positioned in planes parallel to the first direction.

In addition, the two structures are preferentially installed by sliding in a guided manner in said first direction on said uprights having the shape of rails, wherein the two structures are held on said uprights by the mechanical fusible elements.

Therefore it is if these fusible elements are ruptured, following a fall, that the rails guide the structures in a guided manner in the first direction.

According to another embodiment the second portion of the frame includes several structures which no longer surround the body of the package, but which each surround a lifting trunnion comprised by this package body, thus providing the rigid connection of the package body to said second portion of the frame. In this case, these structures surrounding the trunnions may possibly be installed by sliding in a guided manner in said first direction on uprights having the shape of rails, even if this is not the preferred embodiment. These structures are held on said uprights by the mechanical fusible elements.

A last object of the invention is a vehicle for transporting radioactive materials comprising the assembly as described above, wherein the vehicle includes a platform for attaching the assembly superposed on said platform in said first direction, with the first portion of the frame attached to said platform.

Other advantages and characteristics of the invention will appear in the non-restrictive detailed disclosure below.

BRIEF DESCRIPTION OF THE DRAWINGS

This description will be made with reference to the attached drawings, among which.

DETAILED DESCRIPTION OF PARTICULAR EMBODIMENTS

Figure 1:
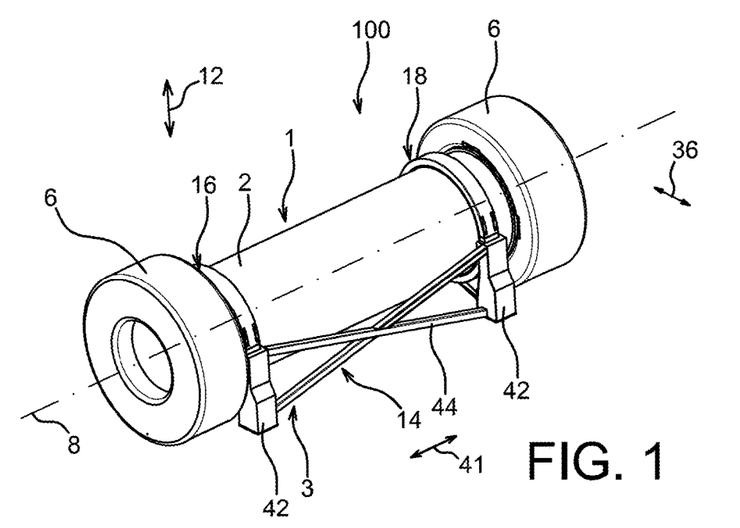
FIG. 1 shows a perspective view of an assembly according to a preferred embodiment of the invention, incorporating a package for transporting radioactive materials and its support frame.

With reference firstly to FIG. 1, an assembly 100 is shown according to a preferred embodiment of the invention, wherein this assembly 100 includes a package 1 for the transport of radioactive materials, together with a support frame 3 supporting the package.

The assembly 1 has a lateral body 2, a base and a cover sealing an opening of the package opposite the base. In FIG. 1 the base and the cover are not visible as they are covered respectively by two shock-absorbing caps 6 installed at the ends of the package body. The package has a longitudinal axis 8 centred relative to lateral body 2, and traversing the cover and also the base of this same package. Axis 8 is positioned roughly parallel to frame 3, and even more precisely positioned parallel to a platform 10 of a vehicle for road transport of radioactive materials 20 shown in FIG. 2, wherein frame 3 is attached to platform 10. In this regard it is noted that assembly 100 is superposed on platform 10 in a first direction 12 corresponding to the vertical direction. It is also in this first direction 12 that package 1 is superposed on frame 3.

Conventionally, the package forms an outer case of an inner package and defines a cavity used to house the radioactive materials, and possibly a storage basket. The radioactive materials may, for example, be waste canisters, or again nuclear fuel assemblies.

Frame 3 has the feature that it is divided into two separate portions, namely a first portion 14 and a second portion 16 which is rigidly attached to the package, wherein the package and this second portion form an entity 18.

Again with reference to FIGS. 1 and 2, first portion 14 includes four uprights 42 which are parallel with one another and orthogonal to platform 10 of the vehicle, to which they are attached, for example by bolts or similar means. Uprights 42, which therefore extend in first direction 12, are distributed at the four corners of an imaginary rectangle, and connected two-by-two by mechanical reinforcement means of the armature 44 type or similar. These armatures extend in longitudinal direction 41, positioned at regular intervals along the body of the package, and therefore connect two-by-two uprights 42, which are spaced in this same direction 41. Between the four uprights and armatures 44 an empty space 26 is defined in the overall shape of a rectangular parallelepiped, through which entity 18 is intended to move in the event of a fall as will be described in detail below.

Figure 2:
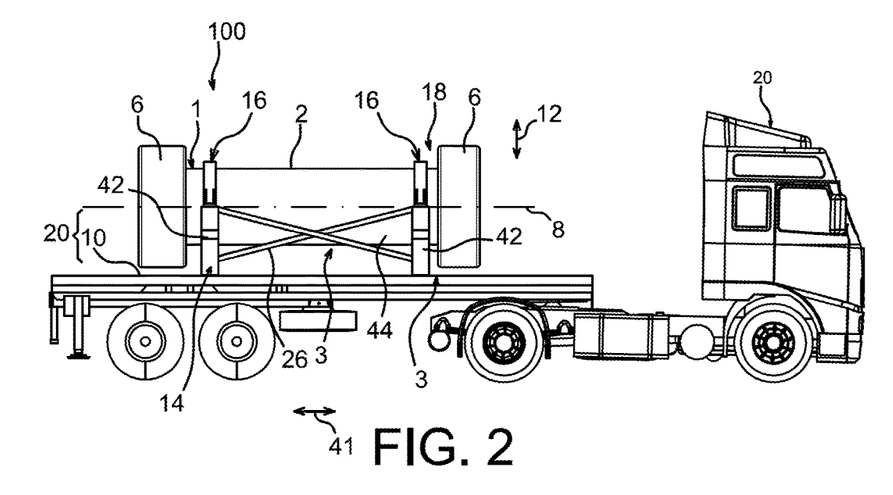
FIG. 2 is a sideways view of the assembly shown in the previous figure, fitted on a vehicle for transporting radioactive materials.

Second portion 16 of frame 3, for its part, includes two annular structures 46, surrounding body 2 of the package. These two structures 46, centred on axis 8 and positioned respectively near the ends of body 2, provide the rigid attachment of package 1 to the second portion of frame 16, in the three directions 12, 36 and 41.

Figure 4:
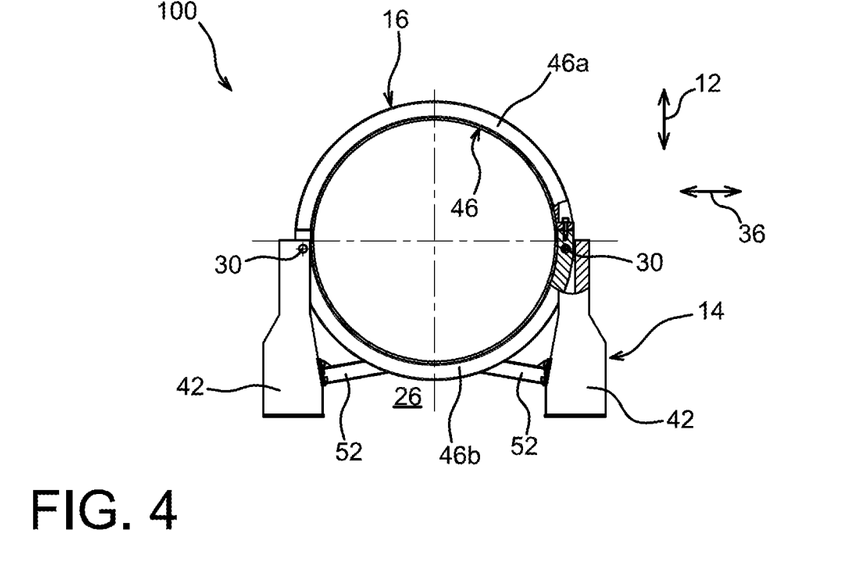
FIG. 4 shows a front view of the frame shown in the previous figure.

Each of the two structures 46 is formed with the assistance of two portions that may be disassembled, each of which extends roughly over 180° and is semicircular in shape. As may be seen more easily in FIG. 4, bolts or similar means may be used to provide the attachment that may be disassembled of the two semicircular portions 46a, 46b, which together form structures 46, positioned in planes parallel to direction 12.

Figure 3:
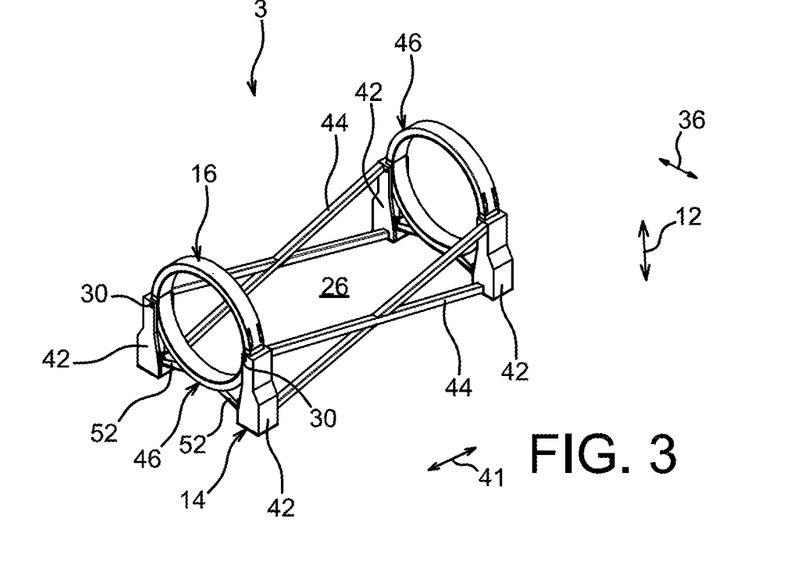
FIG. 3 is a perspective view of the transport frame belonging to the assembly shown in the previous figure.

In this embodiment uprights 42 take the form of rails in direction 12. Two annular structures 46 surrounding body 2 are therefore slid in a guided manner on these uprights having the form of rails 42. As an indication, for each of the two structures 46, two uprights 42 are positioned such that they cooperate with two diametrically opposed portions of the structure in question, as may be seen best in FIGS. 3 and 4.

However, under normal transport conditions, annular structures 46 are held on uprights 42 by frangible shearing plugs 30. Therefore, as will be described in detail below, it is only if these plugs 30 are ruptured, after a fall, that rails 42 slide structures 46 in a guided manner in first direction 12.

In other words, the first portion 14 and the second portion 16 of frame 3 are connected to one another by several frangible shearing plugs 30, positioned so as to hold the two portions 14, 16 relative to one another, in first direction 12 of superposition of the package on the frame. To accomplish this, each fusible plug 30 traverses a rail 42 and the semicircular lower portion 46b of annular structure 46.

Figure 5:
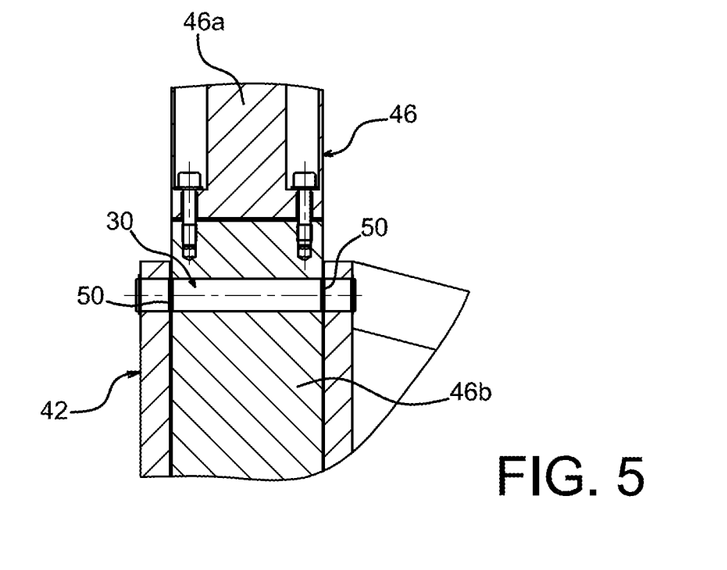
FIG. 5 is a section view of a portion of the frame shown in the previous figure.
Figure 6:
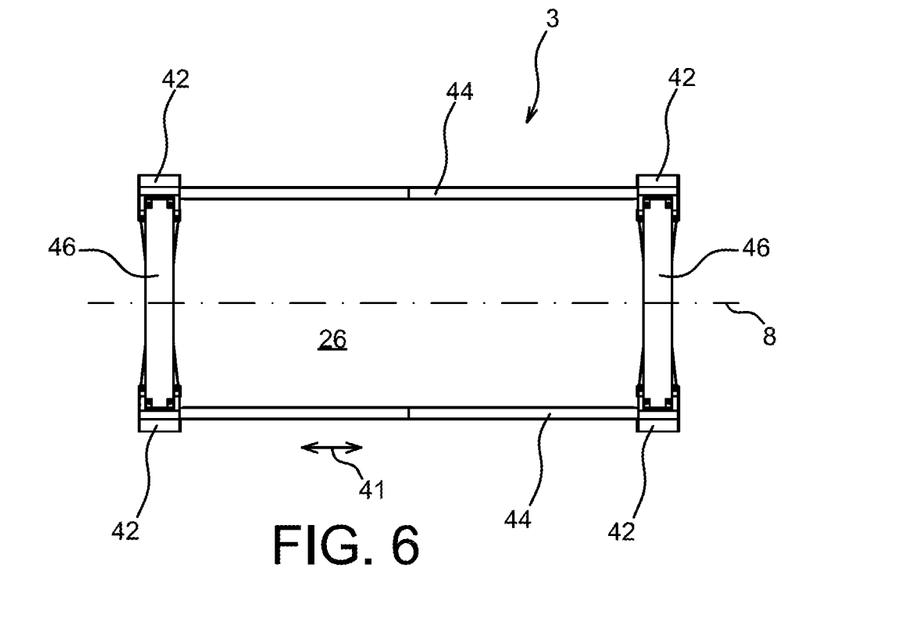
FIG. 6 is a top view of the frame shown in FIGS. 3 and 4.

More accurately, the two branches of rail 42 having a U-shaped section, together with lower portion 46b housed between these two branches, are traversed by a plug 30. In each of the two interfaces between these elements, plug 30 has a groove 50 forming a rupture initiation area, as may be seen in FIG. 5.

It is noted that with this configuration, within which it is lower portion 46b of each annular structure 46 which is connected to uprights 42, the package may be removed from the frame simply by disassembling upper portions 46b of annular structures 46.

One of the features of the invention consists in the fact that if assembly 100 falls in first direction 12, with first portion 14 of the frame pointing forwards, a rupture of frangible plugs 30 occurs, which then allows a movement of entity 18 relative to first portion 14 of the frame, in this same first direction 12. The expression pointing "forwards" must be understood to mean that when the fall in the first direction occurs first portion 14 of the frame is located forwards of entity 18. First portion 14 is thus the portion which is intended to impact first on the impact surface.

Figure 7:
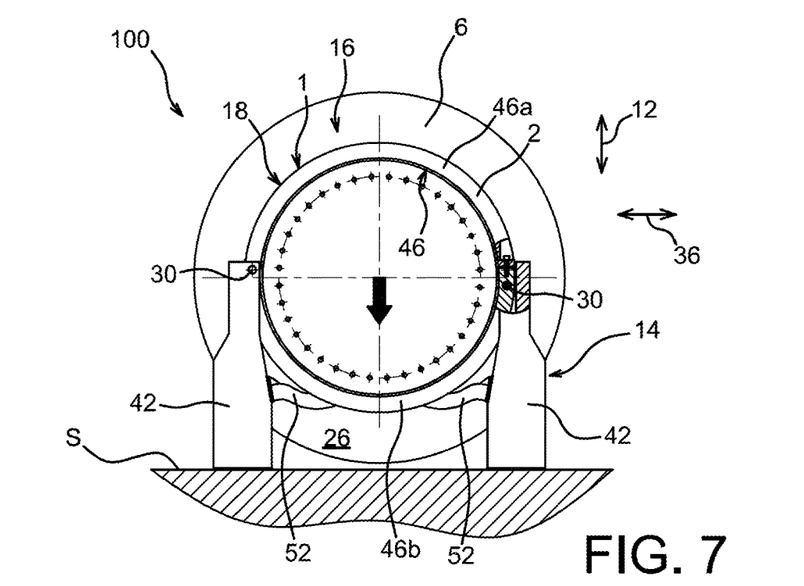
FIG. 7 is a similar view to that of FIG. 4, with the assembly shown in a state as observed during a fall onto an impact surface before the caps are crushed, wherein the head cap has been removed and wherein the cover of the package is revealed.

With reference to FIG. 7 showing diagrammatically these fall conditions on an impact surface S which is flat and orthogonal to direction 12, it is shown that immediately after the start of the impact of first portion 14 on surface S plugs 30 are sheared and lead to a separation of entity 18 relative to this first frame portion 14, in first direction 12. After the rupture entity 18 continues to slide in a guided manner in direction 12, relative to first frame portion 14, due to the cooperation between uprights 42 in the form of rails and structures 46 housed in these rails.

By giving priority to this direction of relative movement entity 18 may thus be guided through space 26, and not be hindered in the course of this movement. The risks of the package being damaged by other parts of the frame are substantially reduced thus. However, although this does not cause any damage to the package, frame 3 may be configured so that, after plugs 30 are ruptured, the second portion of frame 16 remains connected to the first portion of the frame by one or more connecting elements which may be deformed plastically in the course of the relative movement. These deformable connecting elements 52 are, for example, beams which are aligned roughly in transverse direction 36, and may possibly be slightly inclined in vertical direction 12. They connect a lower portion of each upright 42 to a lower portion of corresponding annual structure 46, as may be seen in FIG. 4. These beams 42 help to hold entity 18 mechanically on first portion 14 of the frame, under normal transport conditions. They are configured to be deformed in the event of a fall, after the shearing plugs are ruptured.

As with the first embodiment, translational guidance in direction 12 is active from the start of the relative movement between the entity 18 and the first portion 14 of the frame after rupture of plugs 30, and is even active while these frangible plugs are rupturing. It is noted that this guidance may be active throughout the fall. However, such guidance is not necessarily sought, and clearances might therefore be provided between uprights 42 and annular structures 46 housed in these uprights.

As is shown in FIG. 7, the assembly is configured so that during the fall said rupture of plugs 30 occurs before shock-absorbing caps 6 make contact with impact surface S, although another design might be conceivable without going beyond the scope of the invention.

Figure 8:
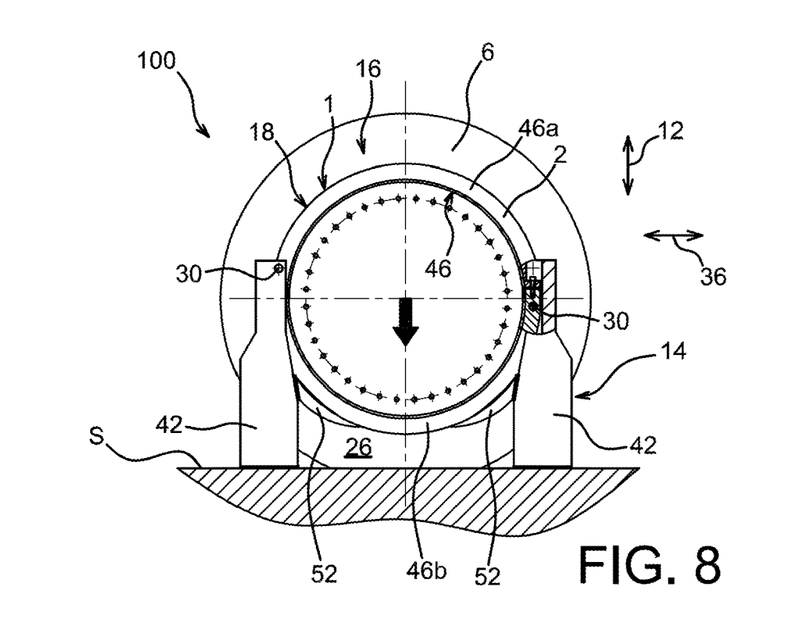
FIG. 8 is a similar view to that of FIG. 4, with the assembly shown in a state as observed during a fall onto an impact surface, after the caps have been crushed.
Figure 9:
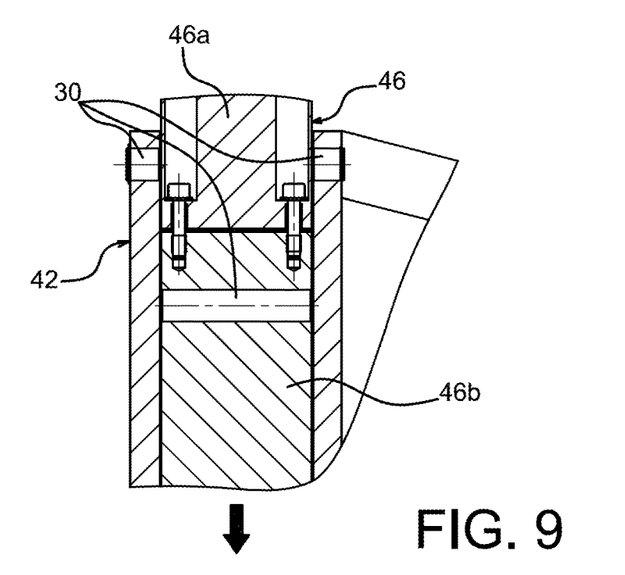
FIG. 9 is a similar view to that of FIG. 5, with the assembly shown in the same state as that of FIG. 8.

After this, as has been shown diagrammatically in FIG. 8, the continuation of the fall causes caps 6 to come into contact with impact surface S, after which these same caps intended to protect the package are crushed, while structures 46 continue to be guided by uprights 42, as has been shown in FIG. 9.

Figure 10:
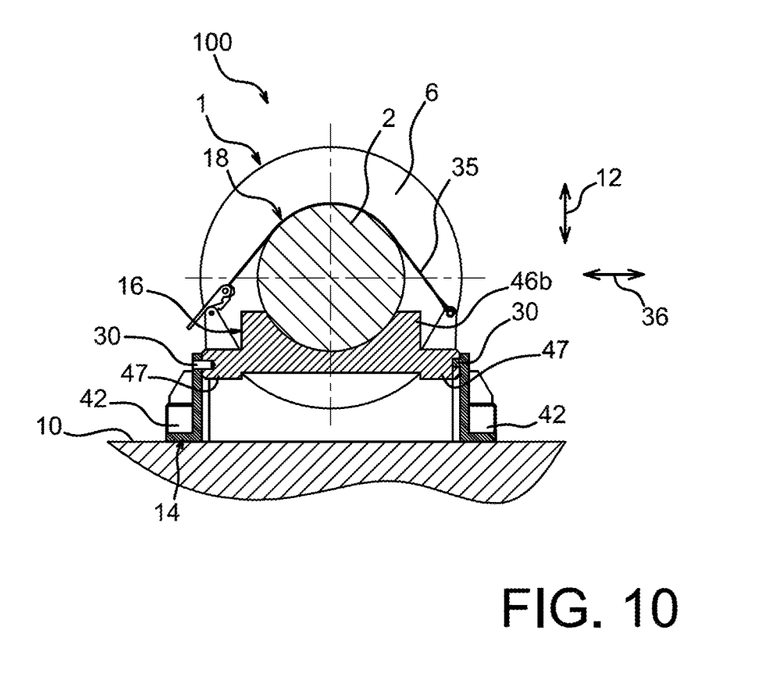
FIG. 10 is a view similar to that of FIG. 7, with the assembly shown according to an alternative embodiment, wherein this figure also corresponds to a section view along line X-X of FIG. 11.
Figure 11:
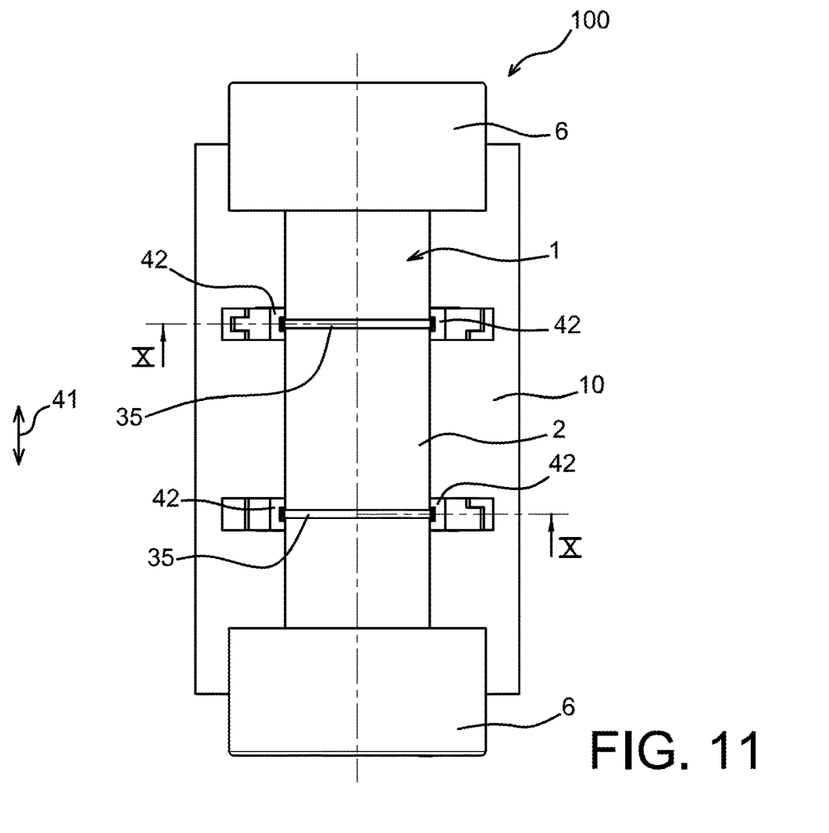
FIG. 11 is a top view of a portion of the assembly shown in the previous figure.

According to an alternative embodiment shown in FIGS. 10 and 11, lower portion 46b is no longer semicircular, but has an overall U shape, with the branches of the U aligned in direction 12. In addition, the lower support surface of the package body remains semicircular.

In this alternative, the branches of the U or lateral extensions 47 of them are used to slide second portion 16 of the frame in a guided manner relative to first portion 14 of the frame, in first direction 12, after the rupture of plugs 30. In an example not shown, the length of the branches of the Us 46 cooperating with the rails may be roughly identical or similar to that of uprights 42, implying improved guidance, even if such guidance remains optional, without going beyond the scope of the invention.

In addition, to surround package the upper portion of body 2, a structure equivalent to upper portion 46a shown in the previous figures may be provided, or alternatively means of the strap type 35, as has been shown in FIGS. 10 and 11.

The frangible plugs 30 may be roughly of the same kind as that described above. For example, on upright 42 in the left of FIG. 10, it is a plug/a pin 30 added on between the two portions 14, 16 of the frame. On the right-hand upright another example is shown in which plug/pin 30 is manufactured as a single part with upright 42, and slid into a corresponding aperture of lower portion 46b. Of course, this other example is applicable to all the preferred embodiments of the invention.

Figure 12:
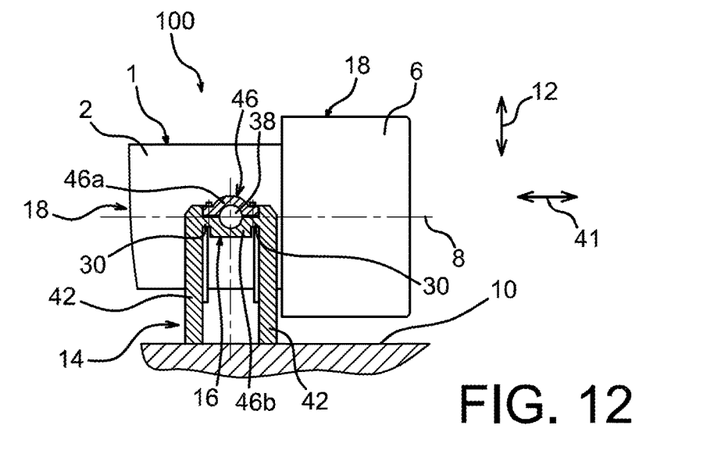
FIG. 12 shows a section view of a portion of an assembly according to another embodiment of the invention, incorporating a package for transporting radioactive materials and its support frame.
Figure 13:
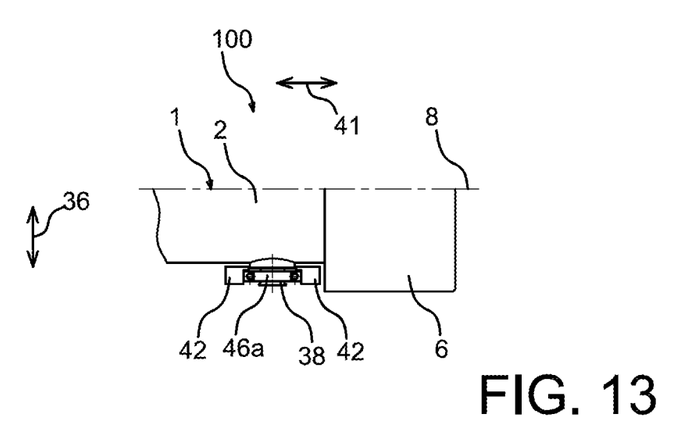
FIG. 13 is a top view of a portion of the assembly shown in the previous figure.

Another preferred embodiment is shown in FIGS. 12 and 13. It contrasts with the previous embodiment essentially due to the fact that annular structures 46 no longer surround package body 2, but lifting trunnions 38 protruding from this body. As many structures 46 as there are trunnions 38 are therefore provided, for example four forming the second portion of frame 16. Here again, structures 46 are connected to uprights 42 forming the first portion of frame 14, by mechanical fusible elements 30. A single structure 46 is preferably connected to two vertical uprights 42, wherein there are then eight vertical uprights 42.

In the embodiment shown uprights 42 are not designed to provide the translational guidance of structures 46 surrounding trunnions 38, even if such a function might be chosen, without going beyond the scope of the invention. In addition, it is noted that lower portion 46b may have an overall U shape, or again a roughly semicircular shape, which is also preferred for upper portion 46a.

Figure 14:
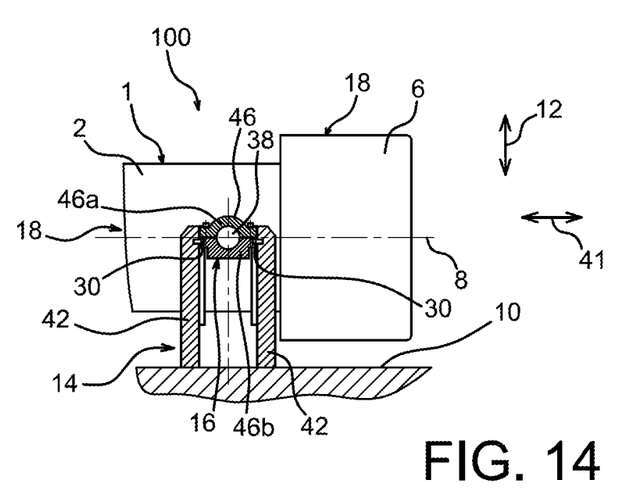
FIG. 14 is a view similar to that of FIG. 12, with the assembly shown according to an alternative embodiment.

In this case, fusible elements 30 take the form of ligaments of material connecting lower portions 46b and uprights 42, the whole assembly being manufactured as a single part. However, for this embodiment, the different solutions described above, incorporating frangible plugs 30, may be chosen, as is for example shown in the alternative of FIG. 14, incorporating plugs/pins 30 added on between the two portions 14, 16 of the frame. For this embodiment, the principle of the invention remains applicable, and entity 18 formed from the four structures 46 and from package 2 moves relative to first portion 14 of the frame formed by the eight uprights 42, after rupture of plugs/ligaments 30 following a fall in direction 12.

Various modifications may be made by those skilled in the art to the invention just described solely with non-restrictive examples.

What is claimed is:

1. Assembly including a package for transport of radioactive materials and a package support frame,
   wherein the frame includes:
      a first portion;
      a second portion which is rigidly attached to the package, wherein the package and the second portion form an entity,
   wherein the first portion and the second portion of the frame are connected to one another by one or more mechanical fusible elements, wherein under normal transport conditions said one or more mechanical fusible elements hold one of the first portion and the second portion of the frame relative to the other in a first direction of superposition of the package on its frame, in order to avoid movement of said second portion, through gravity effect, relative to said first portion in said first direction of superposition,
   and wherein the frame is configured so that a fall of the assembly in said first direction with the first portion of the frame arranged in front of the entity in this first direction causes a rupture of said one or more mechanical fusible elements allowing said entity to move relative to said first portion, in said first direction.

2. Assembly according to claim 1, wherein the first and second portions of the frame comprise guidance means allowing said entity to be guided, at least during a part of said relative movement, relative to the first portion in said first direction.

3. Assembly according to claim 1, wherein said package includes shock-absorbing means configured so that during said fall on a flat impact surface (S) orthogonal to said first direction, said rupture of each mechanical fusible element occurs before contact of the shock-absorbing means with the impact surface.

4. Assembly according to claim 1, wherein each mechanical fusible element takes the form of a shearing device.

5. Assembly according to claim 1, wherein it is configured so that after rupture of each mechanical fusible element, said entity is free relative to the first portion of the frame.

6. Assembly according to claim 1, wherein it is configured so that after rupture of each mechanical fusible element, said entity remains connected to the first portion of the frame by one or more plastically deformable connecting elements, during said relative movement.

7. Assembly according to claim 1, wherein said first portion of the frame includes uprights.

8. Assembly according to claim 1, wherein the second frame portion includes two structures surrounding a body of the package.

9. Assembly according to claim 8, wherein each structure is formed using two portions that may be disassembled, each extending over roughly 180°.

10. Assembly according to claim 8, wherein the two structures are installed by sliding in a guided manner in said first direction on uprights in the form of rails on said first portion of the frame, wherein the two structures are held on said uprights by the one or more mechanical fusible elements.

11. Vehicle for transporting radioactive materials, comprising the assembly according to claim 1, wherein the vehicle includes a platform for attaching the assembly superposed on said platform in said first direction, with the first portion of the frame attached to said platform.

12. The assembly according to claim 3, wherein said shock-absorbing means are shock-absorbing caps fitted at ends of the package.

13. The assembly according to claim 4, wherein said shearing device has a mechanically weakened portion.

14. The assembly according to claim 7, wherein said uprights are in the form of rails extending longitudinally in said first direction.

15. The assembly according to claim 8, wherein said two structures are annular structures.

* * * * *